(12) United States Patent
White

(10) Patent No.: US 6,594,429 B1
(45) Date of Patent: Jul. 15, 2003

(54) MICROSTRUCTURED MULTIMODE FIBER

(75) Inventor: Christopher Alan White, Basking Ridge, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 74 days.

(21) Appl. No.: 09/693,429

(22) Filed: Oct. 20, 2000

(51) Int. Cl.[7] ............... G02B 6/02; G02B 6/18; G02B 6/20; G02B 6/22

(52) U.S. Cl. ............. 385/124; 385/126; 385/127; 385/125

(58) Field of Search ................... 385/122–128

(56) References Cited

U.S. PATENT DOCUMENTS

| | | | |
|---|---|---|---|
| 3,909,110 A | 9/1975 | Marcuse | 385/25 |
| 4,176,911 A | 12/1979 | Marcatili et al. | 385/124 |
| 4,265,515 A | 5/1981 | Kao | 385/127 |
| 4,300,816 A * | 11/1981 | Snitzer et al. | 385/126 |
| 5,907,652 A | 5/1999 | DiGiovanni et al. | 385/125 |
| 6,097,870 A | 8/2000 | Ranka et al. | 385/127 |
| 6,154,594 A * | 11/2000 | Fiacco et al. | 385/126 |
| 6,243,522 B1 * | 6/2001 | Allan et al. | 385/123 |
| 6,418,258 B1 * | 7/2002 | Wang | 385/125 |

FOREIGN PATENT DOCUMENTS

| | | | |
|---|---|---|---|
| EP | 0 810 453 A1 | 12/1997 | G02B/6/12 |
| EP | 0 989 425 A2 | 3/2000 | G02B/6/293 |
| WO | WO 00/37974 | 6/2000 | G02B/6/02 |
| WO | WO 00/49435 | 8/2000 | G02B/6/16 |
| WO | WO 00/49436 | 8/2000 | G02B/6/17 |

OTHER PUBLICATIONS

J.N. Kutz, et. al., "Mode Mixing and Power Diffusion in Multimode Optical Fibers", *Journal of Lightwave Technology*, vol. 16, No. 7, pp. 1195–1202 (Jul. 1998).

Eggleton, B.J., "Cladding–Mode–Resonances in Air–Silica Microstructure Optical Fibers", *Journal of Lightwave Technology*, vol. 18, No. 8, pp. 1084–1099 (2000).

Knight, J.C. et al., "Anomalous Dispersion in Photonic Crystal Fiber", *IEEE Photonics Technology Letters*, vol. 12, No. 7, pp. 807–809 (2000).

Ranka, J.K., et al., "Visible continuum generation in air–silica microstructure optical fibers with anomalous dispersion at 800 nm", *Optics Letters*, vol. 25, No. 1, pp. 25–27 (2000).

Gloge, D. et al., "Multimode Theory of Graded–Core Fibers," *Bell System Technical Journal*, vol. 52, pp. 1563–1578 (1973).

Buck, J.A. *Fundamentals of Optical Fiber*, John Wiley & Sons (1995).

Feit, M.D., et al., "Computation of mode eigenfunctions in graded index optical fibers by the propagating beam method," *Appl. Opt.*, vol. 19, 2240–2246 (1980).

Scarmozzino, R. et al., "Numerical techniques for modeling guided–wave photonic devices," *IEEE J. Select Topics Quantum Electron.*, vol. 6, 150–162 (2000).

* cited by examiner

*Primary Examiner*—Georgia Epps
*Assistant Examiner*—William Choi

(57) ABSTRACT

A new type of multimode fiber is provided, capable of being constructed without the need for chemical doping. The fiber contains a core region comprising a first material and one or more axially oriented elements disposed in the first material. The axially oriented elements (which typically extend throughout the length of the fiber) are configured to provide a graded effective refractive index profile or to provide more focused interaction with selected modes. The fiber further contains a cladding region surrounding the core region, where the cladding region exhibits a refractive index less than the effective refractive index of the portion of the core immediately adjacent the cladding region, i.e., there exists an index step at the core/cladding interface.

3 Claims, 11 Drawing Sheets

$n_{eff} = 1.4842$ $n_{eff} = 1.4741$ $n_{eff} = 1.4583$ $n_{eff} = 1.4846$ $n_{eff} = 1.4741$ $n_{eff} = 1.4583$

MICROSTRUCTURED MULTIMODE FIBER

BACKGROUND OF THE INVENTION

1. Field of the Invention

The invention relates to microstructured optical fiber.

2. Discussion of the Related Art

Interest in high bandwidth optical fiber communication systems continues to increase, and it is well-known that such high bandwidth systems require very low spreading of light pulses as they propagate through the fiber. In a normal step index fiber, different modes travel through the fiber at different rates, causing the pulses to spread. This spreading hampers high speed transmission, because the spreading leads to overlap between the pulses, with this overlap making it difficult to distinguish the propagating signals. Because of this problem of mode overlap, most long-haul transmission systems use single mode fiber. However, the small core size of single mode fiber, e.g., 8 to 9 $\mu$m, makes installation and use of the fiber difficult.

Thus, where possible, e.g., in local area networks and buildings, graded index multimode fibers, which have a larger core, e.g., about 62 $\mu$m, that eases installation, are used. Pulse spreading in conventional graded index multimode fiber is reduced by the graded refractive index profile. Specifically, the graded profile affects distinct propagating modes differently, such that the group velocity of the modes are essentially equal. Spreading of propagating pulses is thereby kept to acceptable levels. Unfortunately, fabrication of graded index multimode fiber has some disadvantages. For example, the graded index is most often provided by doping the silica core of the fiber with germanium. Germanium is expensive and requires complex reclamation procedures. Moreover, the bandwidth of the resultant fiber is highly sensitive to the germanium profile, which requires highly controlled processing steps that tend to increase costs.

Thus, improvements in multimode fiber design and fabrication would be desirable.

SUMMARY OF THE INVENTION

The invention provides a new type of multimode fiber, capable of being constructed without the need for chemical doping. The fiber contains a core region comprising a first material and one or more axially oriented elements disposed in the first material. (The core region is the region in which light primarily propagates). The axially oriented elements (which typically extend throughout the length of the fiber) are configured to provide a graded effective refractive index profile or to provide more focused interaction with selected modes. The fiber further contains a cladding region surrounding the core region, where the cladding region exhibits a refractive index less than the effective refractive index of the portion of the core immediately adjacent the cladding region, i.e., there exists an index step at the core/cladding interface. This step inhibits loss of optical power that is scattered from the core region. The elements are optionally air-filled capillary holes, and are typically located in a circumferential manner around the center of the fiber.

In a first embodiment, a relatively large number of holes (having diameters smaller than the wavelength of light propagating through the fiber), are used to construct an effective index profile that mimics the profile of a conventional graded index fiber. In a second embodiment, using predicted modal field profiles, axially oriented elements are configured to selectively provide interaction with (i.e., manipulate) particular modes.

The concept of microstructured fibers, e.g., fibers having air holes formed therein, is known. Various groups have studied the properties of fibers that utilize air holes as a cladding structure See, e.g., B. J. Eggleton et al., "Cladding-Mode-Resonances in Air-Silica Microstructure Optical Fibers," *Journal of Lightwave Technology*, Vol. 18, No. 8 (2000); J. C. Knight et al., "Anomalous Dispersion in Photonic Crystal Fiber," *IEEE Photonics Technology Letters*, Vol. 12, No. 7 (2000); J. Ranka et al., "Visible continuum generation in air-silica microstructure optical fibers with anomalous dispersion at 800 nm," *Optics Letters*, Vol. 25, No. 1 (2000); and U.S. Pat. Nos. 5,907,652 and 6,097,870. In such structures, the air holes have typically been relatively large compared to the wavelength of the light, and thus generally provided steps in refractive index from silica to air, with the high index contrast providing some interesting properties.

In contrast to this prior work, the invention reflects the recognition that it is possible to design a microstructure that provides an effective refractive index profile which mimics the profile of a conventional graded index multimode fiber, or which provides selected modal manipulation. This recognition makes it possible to form multimode fiber without the typical problems, e.g., germanium recovery and germanium distribution control. In fact, it is expected that it will be possible to tune the profile for various applications, simply by adjusting the arrangement, e.g., size, location, material, of the axially oriented elements.

DETAILED DESCRIPTION OF THE INVENTION

Figure 1:
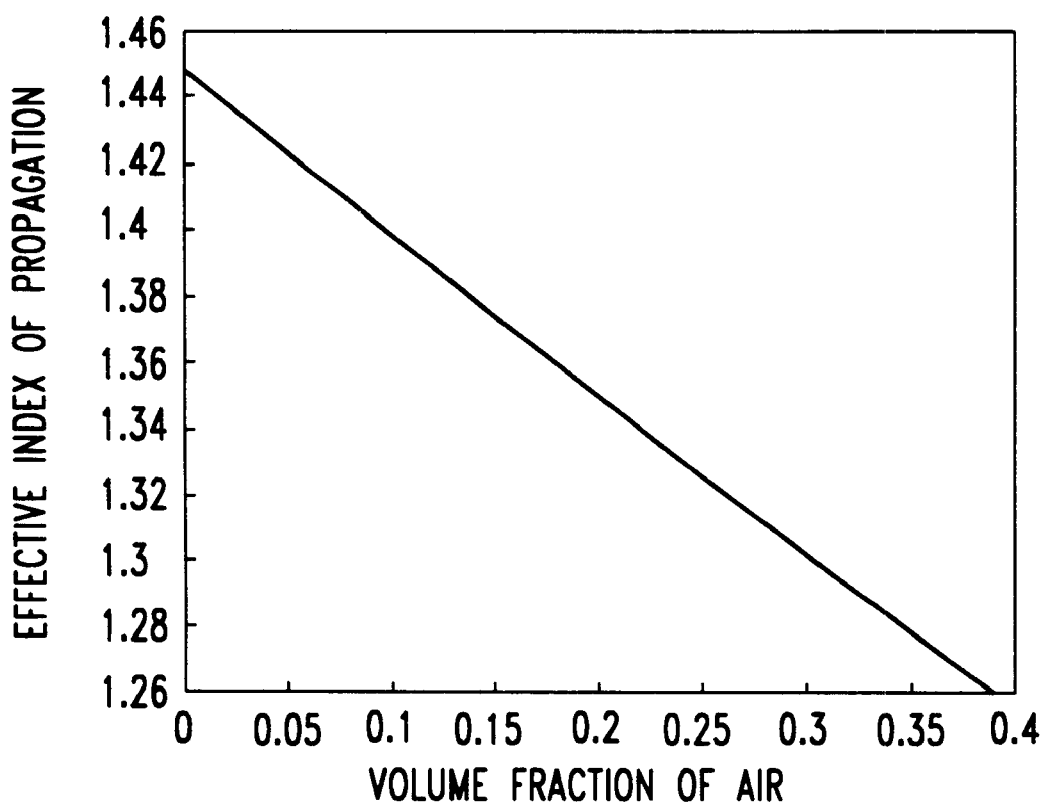
FIG. 1 illustrates the relationship of volume fraction of air in a region of fiber to the effective refractive index of the fiber.

The invention relates to a microstructured optical fiber that comprises a core region comprising a first material having axially oriented elements disposed therein, where the axially oriented elements are configured to provide a graded effective refractive index profile and/or to provide more focused interaction/interference with selected modes. (First material is intended to broadly define any of a variety of suitable material or materials for the core region, and includes, for example, a single material or a combination of materials, e.g., doped materials, including materials having compositional gradients.) The fiber further contains a cladding region surrounding the core region, where the cladding region exhibits a refractive index less than the effective refractive index of the portion of the core immediately adjacent the cladding region, i.e., there exists an index step at the core/cladding interface. This step inhibits loss of optical power, i.e., light, that is scattered from the core region, typically due to interference with the axially oriented elements. The fiber is typically capable of providing multimode operation over wavelengths of 890 to 1600 nm.

The elements are typically air-filled capillary holes, and are typically located in a circumferential manner around the center of the fiber. Generally, the more radially symmetrical the holes, the less susceptible the fiber is to polarization sensitivities. Embodiments using circular air holes are used below to illustrate and describe the invention. Holes having a variety of configurations shapes are possible. Moreover, instead of holes, it is possible to use axially oriented elements of a material distinct from the primary fiber material, e.g., filled holes, where the material provides particularly desired properties, e.g., index contrast.

In one embodiment of the invention, physical structure, e.g., the presence of capillary air holes, is used to mimic the refractive index profile of a typical graded index multimode fiber. Conventional graded index multimode fiber has many optical modes that all have similar group velocities. This is in contrast to a simple step index multimode fiber where the various modes have different group velocities. For communications applications, graded index multimode fiber is therefore preferred over step index. The behavior of graded index multimode fiber results, as the name implies, from the graded radial refractive index profile of the fiber. The near optimal refractive index profile is given by $$n(r) \approx n_{core}\sqrt{1 - 2\Delta\left(\frac{r}{a}\right)^2} \qquad (1)$$

where n is refractive index, r is distance from the center of the core, a is the radius of the core and $\alpha =$ $$\Delta = \left(\frac{n_{core}^2 - n_{clad}^2}{2n_{core}^2}\right)$$

is related to the difference between the index at the center of the core ($n_{core}$) and at the outer cladding ($n_{clad}$). (See D. Golge and E. A. J. Marcatili, "Multimode Theory of Graded-Core Fibers," *Bell System Technical Journal*, Vol. 52, 1563–1578 (1973).)

The ray picture of propagation enables the justification of Eq. 1, and is useful in developing the invention's structural method of achieving a similar profile. In the ray picture, the lower order modes are represented by rays which lie almost parallel to the fiber axis. The higher order modes are represented by rays which form a larger angle with the fiber axis. Thus for a given length of optical fiber, the higher order modes travel a much longer distance than the lower order modes. One can view this as the higher order modes zig-zaging across or around the fiber axis as they propagate. If the speed of propagation of the modes is similar (as it is in a step index fiber), the time for the higher order modes to travel along the fiber will be longer. Equation 1, however, defines a fiber with a graded index, i.e., a higher index in the core, and a smaller index near the cladding. The higher order modes (concentrated outside the central core) therefore see a lower index and travel faster than the lower order modes which see a higher index in the central core. The balance of longer distance and faster propagation versus shorter distance and slower propagation enables the lower order and higher order modes to reach the end of the fiber at the same time.

Conventionally, this graded index profile is achieved by doping the silica glass with germanium, as discussed above. The invention, however, achieves an index profile that approximates Eq. 1 by modifying the physical structure of the glass rather than its composition. To achieve a graded profile using such structure, the higher order modes are influenced by placing structural features near the core-cladding interface. Typically, a design involving a pattern of holes is developed, the pattern mimicking a graded index profile. In particular, when air holes are much smaller than the wavelength of light, e.g., having a diameter less than 20% of the wavelength of propagating light in the core region, the holes do not appreciably scatter the propagating radiation. (It is possible for some or even all of the holes in a particular design to have a diameter 20% or more of the propagating wavelength, and still provide sufficient properties, e.g., the amount of scatter may be acceptable. The actual size of the holes will be determined by the desired properties of the fiber, as well as the ability to form holes of a particular size with the process being used.) Thus, the interaction of the light with the microstructured material essentially becomes an interaction with a homogeneous medium, where the medium's effective refractive index is related to the fraction of air (or other material) within the glass:

$$n_{eff} = x_1 n_1 + (1 - x_1) n_2 \qquad (2)$$

where $n_{eff}$ is the effective refractive index, $n_1$ and $n_2$ are the refractive indices of the first and second materials (e.g., silica and air), and $x_1$ is the area fraction of the second material (e.g., air) in a particular area of interest. This relationship is reflected in FIG. 1, which shows the effective index computed for a planewave propagating along a direction parallel to an infinite array of air holes, using a full vector Maxwell solver. (The linearity of this relationship rigorously holds in a long wavelength limit where the wavelength of light in the high index material is much larger than the diameter of the air holes.) For an optical fiber, all that need be considered is the area fraction covered by holes within a limited region. The design of this first embodiment—a microstructured multimode fiber with an effective graded index profile—therefore involves placing small holes in a configuration that yields an air hole distribution which is radially parabolic in shape. This essentially ensures that the higher order modes see a higher volume fraction of air and thereby travel faster than the lower order modes that are closer to the core.

There are numerous hole configurations capable of providing such a parabolic volume fraction. When approximating a radially symmetric profile, a relatively easy configuration is a set of radial rings of holes. These rings are defined by a radial position for each ring ($R_i$), and given this radial position, the area of each ring is given by $$A_i = \pi(R_{i+1}^2 - R_i^2) \qquad (3)$$

The area within each ring occupied by holes of radius ($h_i$) and of number ($N_i$) is $$N_i \pi h_i^2 \quad (4)$$

In general, it is possible for all of these quantities to change with ring number i, to achieve a given effective refractive index within each ring. As the number of rings becomes large, the profile approximates a continuous radial effective index. The effective refractive index for ring i is given by $$n_i = n_{Glass} \sqrt{1 + \frac{N_i \pi h_i^2}{\pi(R_{i+1}^2 - R_i^2)}\left(\frac{1 - n_{Glass}^2}{n_{Glass}^2}\right)} \quad (5)$$

A technique for achieving a profile similar to Eq. 1 is to use a distributions of holes having the same radius ($h_i$). If the ring radius increases as the square root of the ring number, $$R_i = \sqrt{\frac{i}{N_{ring}}} \quad (6)$$

all of the rings have the same area. Thus, the number of holes in each ring needs to increase linearly with ring number $$N_i = \alpha i \quad (7)$$

where α and the hole radius (h) are selected to achieve a given maximum value of index depression (normally ~2% for standard doped multimode fibers).

An alternative technique is to allow the hole radius ($h_i$) to vary rather than the number of holes. A multitude of combinations of hole radius, number and location are possible, and it is within the ability of one skilled in the art to explore such combinations by matching Eq. 5 with Eq. 1. The holes are often uniformly spaced within each ring to minimize any angular variation in the effective index. Between rings, it is possible for the holes to be staggered to randomize the angular structure in the effective refractive index. In addition to providing the effective graded index profile, the axially oriented elements also tend to provide mode mixing during propagation of modes down the fiber, which further contributes to an essentially equal group velocity. Suitable designs for graded index multimode fiber according to the invention are reflected in the examples below.

In a second embodiment of the invention, which is capable of being combined with the first embodiment, one or more axially elongated elements (typically holes) are selectively placed in a microstructured fiber to provide desired interaction with specific propagating modes, i.e., to manipulate those specific modes. (Interaction indicates that propagation of the selected modes is affected.) This manipulation is possible because the construction of an effective refractive index profile using structure, e.g., air holes, enables a controllable two dimensional variation of the index (radially and angularly). This is in contrast with conventional fiber preform construction methods which introduce only radial variations in index (or in some cases a gross angular variation). As discussed above, for multimode fiber having thousands of optical modes, an effective graded index profile is attained by placing holes in positions which tend to interact most strongly with the higher order modes, i.e., simply mimicking a conventional graded index fiber. According to this second embodiment, a more detailed knowledge of the modal profiles enables a more precise, two dimensional placement of holes to attain desired modal manipulation. In particular (primarily for multimode optical fiber having <100 modes), it becomes possible to address modes individually rather than simply mimic a conventional graded index.

It is possible to obtain the modal profiles of a fiber semi-analytically for step index fiber. (See, e.g., J. A. Buck, *Fundamentals of Optical Fiber*, John Wiley & Sons (1995).) As a first estimate, one can begin by placing holes on the nodes (i.e., the places of zero intensity for a mode) and anti-nodes (i.e., the places of highest intensity). In such a case, the modes that interact strongly with a hole (anti-nodes) will be greatly affected. The modes that interact only weakly with a hole (nodes) will remain largely unchanged. In this embodiment, as compared to the first embodiment above, the holes introduced into the fiber do not need to be smaller than the wavelength of light. Specifically, the size of the hole only relates to the overlap of the hole with the optical mode. Such modal manipulation is reflected in Example 4 below.

This second embodiment will therefore generally involve a system having a source for generating at least one wavelength of light (typically 890 to 1600 nm), the source transmissively coupled to the microstructured fiber such that multiple modes of the light are launched into the fiber. The axially oriented element or elements are located such that the element or elements interfere with at least one mode of the launched light. Optionally, as noted above, the element or elements are located at nodes or anti-nodes of particular modes to induce either strong or weak interference with those propagating modes.

For all embodiments of the invention, to place the holes in advantageous, if not optimal, locations, a method is generally needed for detailed computation of the modal profiles after the inclusion of the holes. This type of refractive index profile is generally too complicated to be solved analytically, and numerical methods are therefore typically used for computing the modes of the fiber. Several such computational models exist for computing the optical modes of a two dimensional refractive index profile, including the Beam Propagation method, the Correlation Method, and the Modal Model. (See, e.g., B. J. Eggleton et al., "Cladding-mode-resonances in air-silica microstructure optical fibers," *Journal of Lightwave Technology*, Vol. 18, 1084–1100 (2000); M. D. Feit and J. J. A. Fleck "Computation of mode eigenfunctions in graded index optical fibers by the propagating beam method," *Appl. Opt.*, Vol. 19, 2240–2246 (1980); and R. Scarmozzino et al., "Numerical techniques for modeling guided-wave photonic devices," *IEEE J. Select Topics Ouantum Electron.*, Vol. 6, 150–162 (2000).) The high contrast interfaces between glass and air require attention to the numerical stability of such methods. One particularly useful method is the beam propagation method (BPM), as discussed in B. J. Eggleton et al, supra. This method adequately treats the high index contrast and also addresses the effects of leaky modes that contribute to scattering-induced loss.

In combination with the Correlation Method, the BPM computes sets of transverse optical mode intensity profiles and optical effective indices for each mode. The variation of these effective indices with wavelength directly determines the modes' group velocity and thus the modal dispersion. Thus, for a fixed number of holes, the hole location is capable of being adjusted, if not optimized, to substantially reduce modal dispersion. A full computation capable of individually addressing each mode, as would typically be performed in the second embodiment above, becomes very complicated for a system having a large number, e.g., thousands, of modes. These analysis tools, when used for specific manipulation of individual modes, are thus better applied to a few mode fiber (e.g., having <100 modes).

Once the desired configuration of holes is determined, it is possible to use any suitable method to form the fiber preform. Advantageously, a sol-gel technique is used, such as discussed in co-assigned U.S. patent application Ser. No. 09/613320, filed Jul. 11, 2000 (our reference De Hazan 1-82-7-6-10). Described generally, this technique involves providing a vessel (typically tube shaped), with elongate elements (e.g., wires, needles, or fibers) extending at least a portion of the length of the vessel and provided in a predetermined spatial arrangement, selected as discussed above. The vessel is at least partially filled with a silica-containing sol, and the sol is gelled, such that a gel body with the elongate elements embedded therein is formed. The gel body is separated from the elongate elements (typically with the aid of a release agent), dried, purified, and sintered, and then the microstructured optical fiber is drawn from the sintered gel body. A suitable sol-gel formulation is reflected, for example, in co-assigned U.S. Pat. No. 5,240,488.

Typically, the elongate elements are maintained in the desired spatial arrangement by holding fixtures, e.g., a bottom and a top end cap with appropriately located holes and recesses. The vessel typically is a tubular vessel, with the bottom opening of the vessel closed off by a removable cap or other appropriate closing means. The top holding fixture typically is axially movable to facilitate removal of the elongate elements from the gel body. It is also possible for the elongate elements to be physically, chemically or thermally removable, e.g., polymer rods or fibers, such that the elements are capable of being removed after gelation, e.g., by pyrolysis or chemical action.

Figure 2:
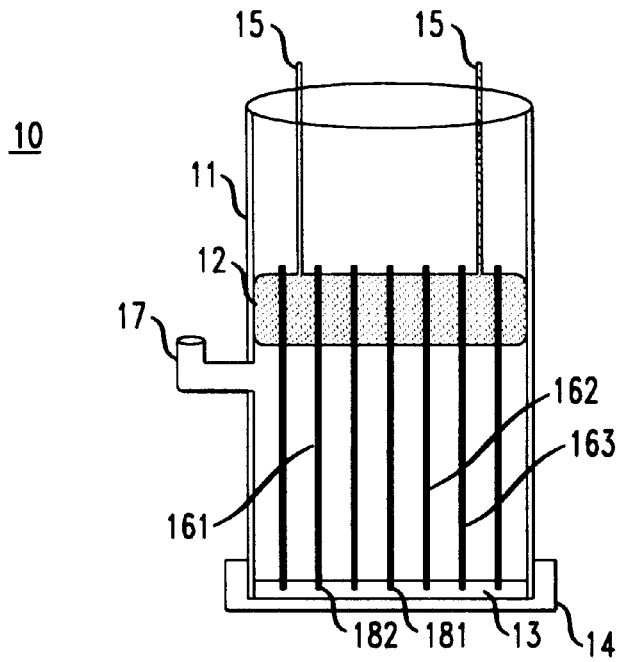
FIG. 2 illustrates a step in a technique by which the fiber of the invention is capable of being formed.

FIGS. 2–5 illustrate embodiments of such a technique. (For clarity, the embodiments show a smaller number of elongated elements than are typically used to form the multimode fiber of the invention.) FIG. 2 shows a vessel 10 (generally referred to as a mold) that is ready to receive the sol. Numeral 11 refers to a (typically cylindrical) vessel, e.g., an acrylate, silica or steel tube. Numeral 12 refers to an upper holding fixture that is slideable within vessel 11 and maintains rod-shaped elongate elements 161, 162, 163 etc. axially aligned in a desired spatial arrangement that replicates the arrangement of recesses 181, 182, . . . in lower holding fixture 13. Recesses 181, 182, . . . receive the elongate elements 161, 162, . . . Removable end cap 14 holds fixture 13 in place. The cap 14 not only serves to hold fixture 13 in a desired spatial arrangement but also serves to prevent leakage of the sol from the vessel. Optional rods 15 serve to move upper holding fixture 12 axially within the vessel. Typically, the upper and lower holding fixtures are made of TEFLON. An orifice 17 is provided to facilitate introduction of sol into the mold, and also to facilitate introduction of pressurized water into the space between upper holding fixture 12 and the gelled sol. Alternatively, an additional orifice, typically located at the end cup 14, is used to fill the mold, either singly or in tandem with one or more other orifices.

Figure 3:
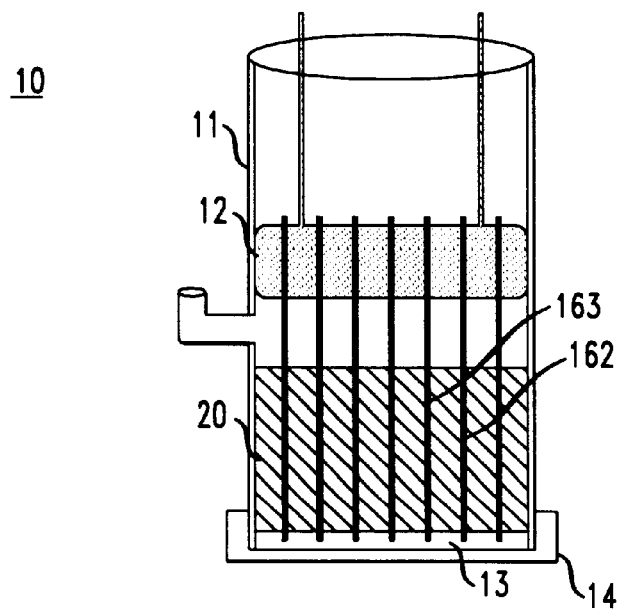
FIG. 3 illustrates another step in the technique of FIG. 2.
Figure 4:
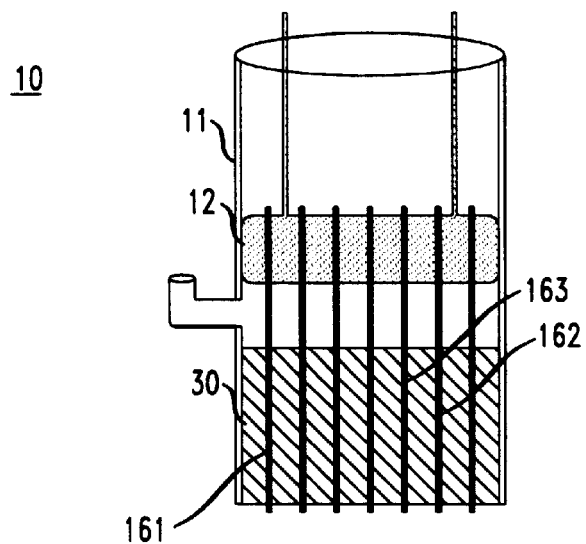
FIG. 4 illustrates a further step in the technique of FIG. 2.
Figure 5:
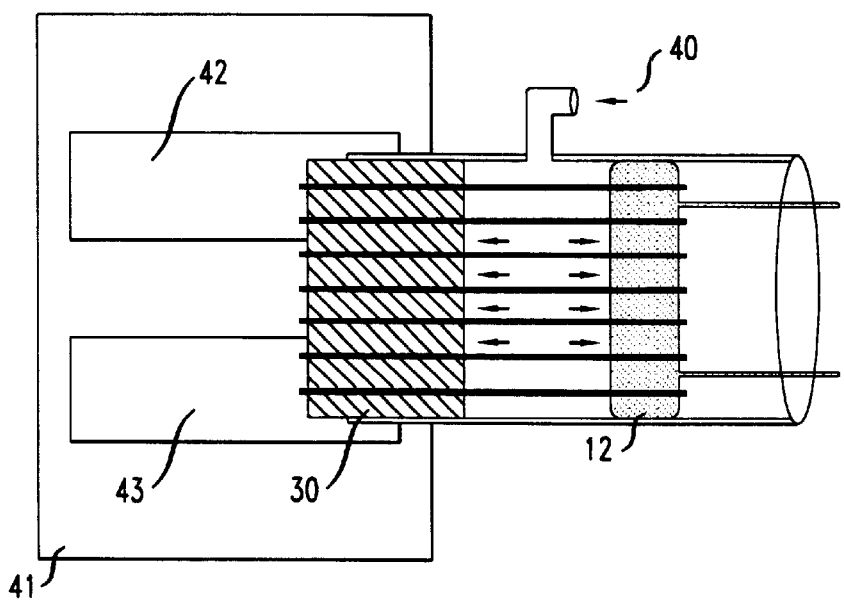
FIG. 5 illustrates yet a further step in the technique of FIG. 2.

FIG. 3 shows the mold after introduction of sol 20. FIG. 4 shows the mold after formation of gel 30, and after removal of holding fixture 13 and end cap 14 in preparation for removal of the aged gel body 30 from the mold. Typically, prior to removal, the gel is aged for a period, sufficient to result in syneresis, wherein the gel shrinks and water is expelled. The expelled water is generally able to serve as lubricant to aid in the removal of the gel body from the mold. Removal of the gel body typically is also facilitated by application of one or more known mold release substances, e.g., polyethylene, silicon or TEFLON spray, or a chrome coating. Removal is accomplished by any suitable method, e.g., by introduction of pressurized water into orifice 17, thereby forcing apart the gel body and the upper holding fixture 12. This is shown schematically in FIG. 5. It will be understood that generally the rods 161 etc., remain fixed in upper holding fixture 12, whereas aged gel body 30 is forced axially out of the vessel. Alternatively, it is possible for the elongate elements to be removed prior to removal of the gel body from the mold. The resulting aged gel body advantageously is received by a conventional collection device (e.g., comprising rollers 42, 43) in a water bath 41.

After removal of the gel body from the mold and transforming the gel body into a glass body (preform) by drying, purifying, and sintering (and optionally overcladding), following known techniques, microstructured optical fiber is drawn in conventional fashion from the preform. In one approach, the air holes at one end of the preform are closed off before the fiber is drawn from the other end. The air holes thereby become substantially self-regulating, making the draw conditions less critical. In another approach, the air holes are open at the upper end of the preform, which requires drawing under relatively high tension.

Figure 6:
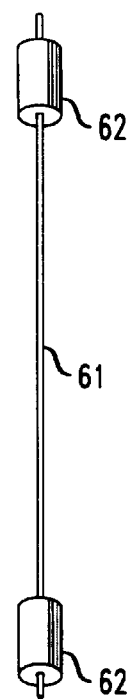
FIG. 6 illustrates a step in an alternative technique by which the fiber of the invention is capable of being formed.
Figure 7:
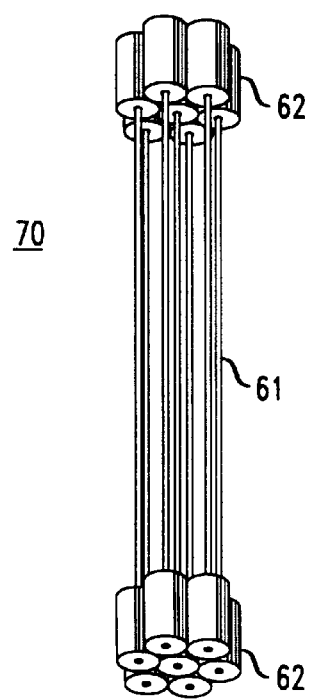
FIG. 7 further illustrates the technique of FIG. 6.
Figure 8:
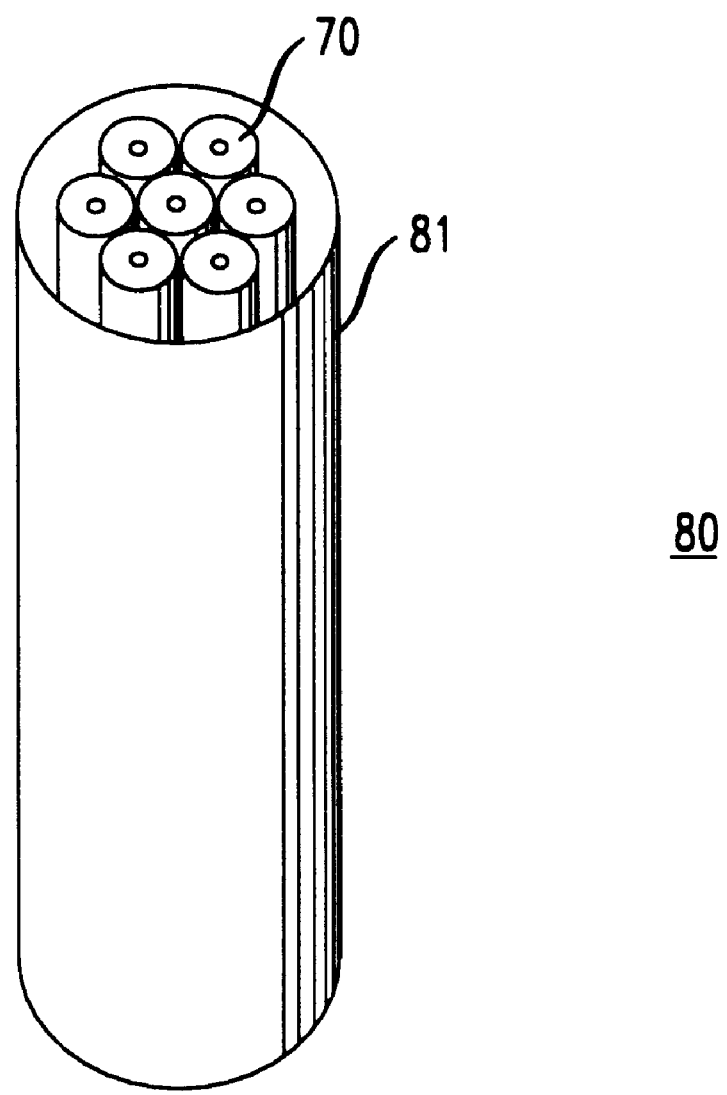
FIG. 8 further illustrates the technique of FIGS. 6 and 7.

In an alternative approach to assembling and disposing the elongate elements, each elongate element is provided with two or more spacers, referred to as ferrules, that serve to maintain the elongate elements in position. This is illustrated in FIGS. 6–8, where FIG. 6 schematically depicts a single elongate element 61 with two ferrules 62 disposed thereon, FIG. 7 depicts an assembly 70 of elongate elements 61 with ferrules 62 disposed thereon, and FIG. 8 depicts assembly 80 consisting of assembly 70 disposed in vessel 81, ready to receive the sol. This alternative approach is generally useful in the manufacture of microstructured fiber having a large number (e.g., hundreds) of air holes, such as the multimode fiber of the invention. In addition, by making the ferrules on a given one of the elongate elements larger than the ferrules on the other elements, it is possible to thereby introduce a defect, to modify the optical properties of the resulting fiber.

While the invention relates primarily to providing a fiber microstructure that provides a useful multimode fiber, a variety of combinations with, and modifications of, the fiber microstructure are possible The invention will be further clarified by the following examples, which are intended to be exemplary.

EXAMPLE 1

Figure 9A:
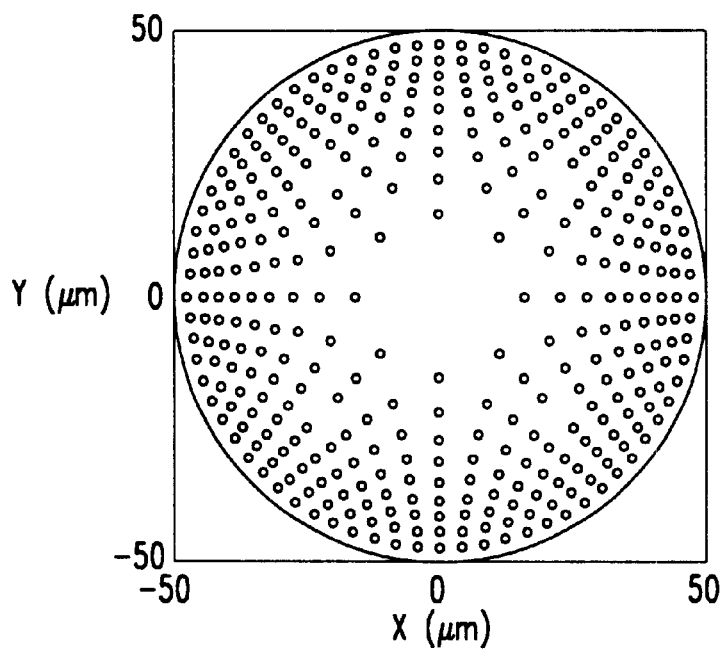
FIGS. 9A and 9B illustrate a design for multimode fiber of the invention and the calculated refractive index profile.

FIG. 9A shows a design for multimode fiber according to the invention. The design contains 10 rings, with the number of air holes in each ring increasing by a factor of 8 ($N_i=8i$). The radius of each ring equals the square root of the fraction of the distance from the center ($R_i=\text{sqrt}(i/N_{ring})$), and all of the holes are the same radius (0.45 $\mu$m). The design requires a total of 360 holes. The outer diameter of the design (50 $\mu$m) is selected to match the core size of standard multimode optical fiber. The design therefore allows a core rod to be overclad with a glass cladding tube or a low index polymer having a refractive index lower than the effective index of the immediately adjacent portion of the core region.

Figure 9B:
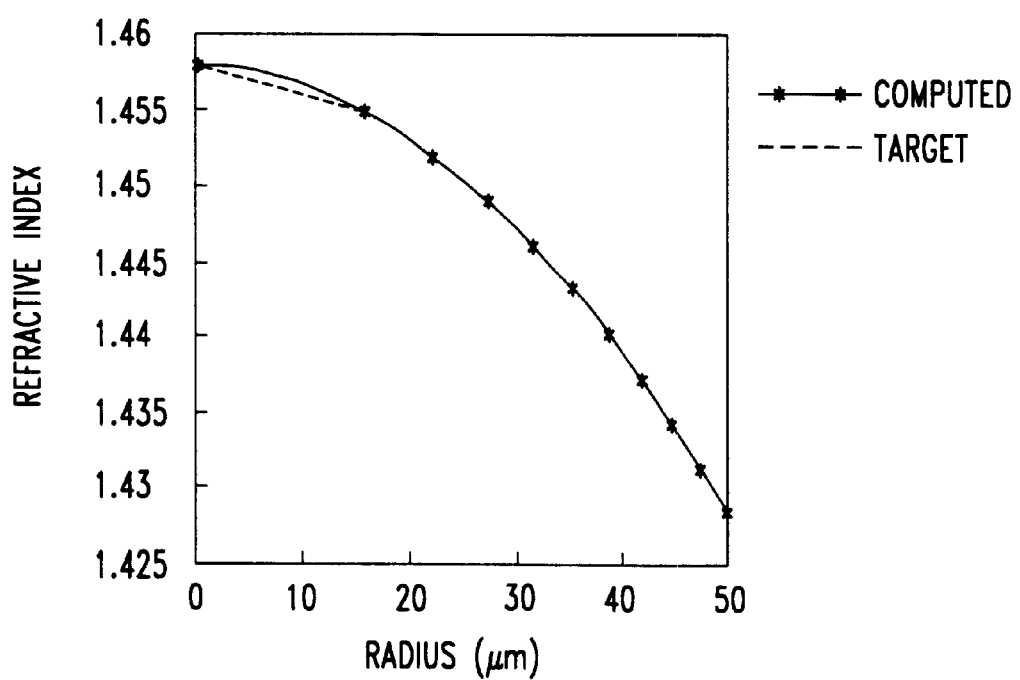

FIG. 9B shows the effective refractive index profile for the design of FIG. 9A. As shown in the Figure, the profile, calculated by use of equation 2, matches an approximate target index profile for graded index multimode optical fiber. The slight deviations arise primarily from the relatively small number of rings (10). As the number of rings is increased, the effective index profile will become smoother, and more closely approach the true graded index profile. This design, because of the relatively small number of holes, promotes easier fabrication.

Figure 10:
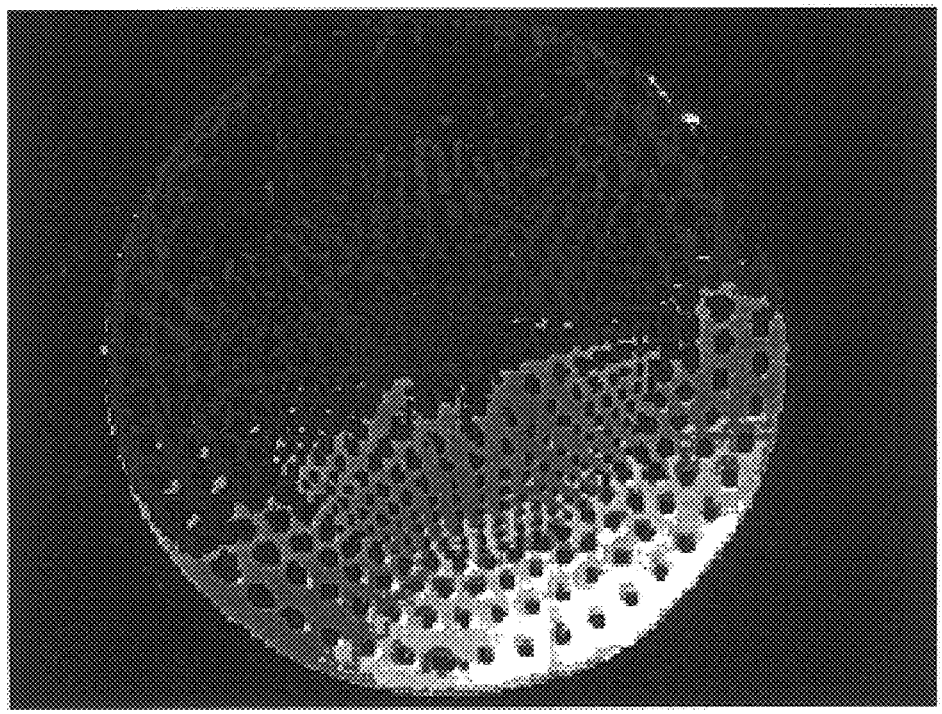
FIG. 10 shows a cross-section of an optical fiber preform incorporating the microstructured design of FIG. 9A.
Figure 11:
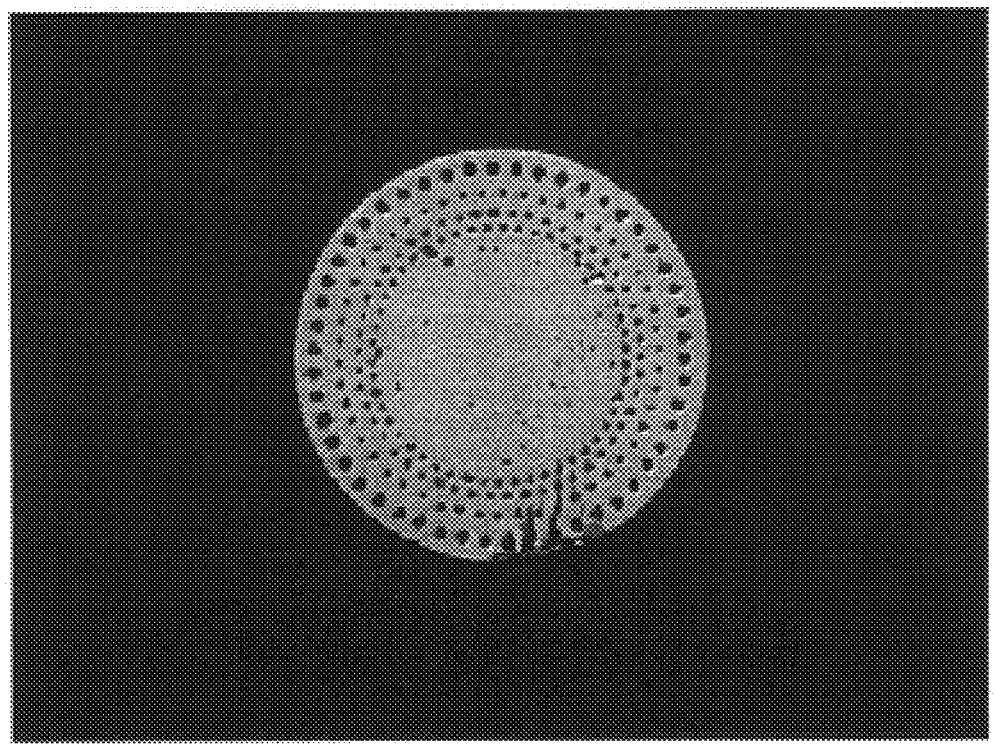
FIG. 11 shows the cross-section of optical fiber drawn from the preform of FIG. 9.

Following the design of FIG. 9A, a fiber preform was made according to the sol-gel technique presented above, and fiber drawn from the preform. Specifically, two Teflon end plates were constructed with a precision-drilled hole pattern of the axially oriented element design. Metal wires of an appropriate size were threaded through both end plates, which were located on either side of a conventional mold. The mold was filled with sol in the manner described above, and the sol was gelled. The metal wires were removed, and the body was then removed from the mold, dried, purified, and sintered to a consolidated preform. Fiber was then drawn from the preform by conventional techniques. The cross-section of the preform is shown in FIG. 10, and the cross-section of the fiber is shown in FIG. 11.

EXAMPLE 2

Figure 12A:
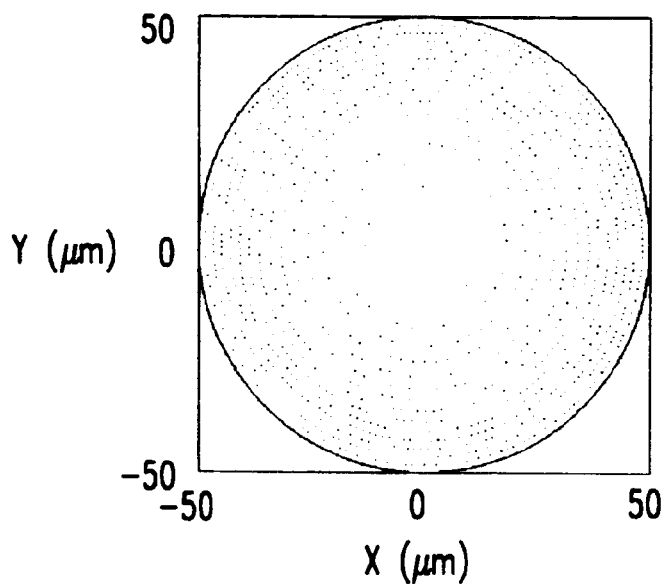
FIGS. 12A and 12B illustrate a design for multimode fiber of the invention and the calculated refractive index profile.
Figure 12B:
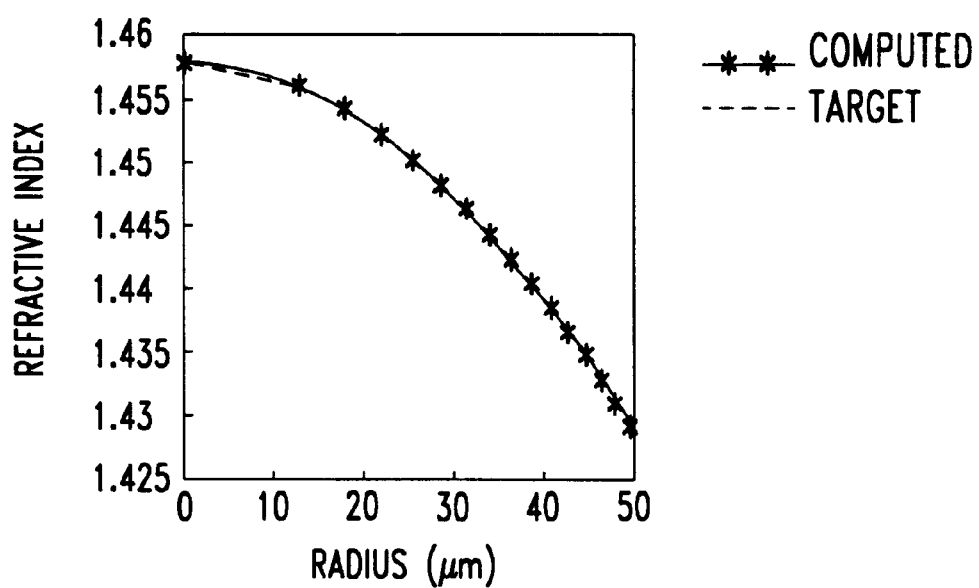

Another design for multimode fiber according to the invention is shown in FIG. 12A. This design is essentially a refined version of Example 1, and uses the same hole size. Again, the number of holes increases linearly with the ring, but now much more quickly ($N_i=20i$), and the number of rings in this design is 20. These differences from the design of Example 1 allow a decrease in size of the individual air holes while maintaining an identical refractive index profile. The volume fraction of holes thereby remain identical, but smaller holes will tend to decrease the optical loss arising from scattering. Also, by increasing the number of holes in each ring, the design becomes more radially symmetric, and thus tends to be less susceptible to polarization sensitivities. The calculated refractive index profile for the design is shown in FIG. 12B.

EXAMPLE 3

Figure 13:
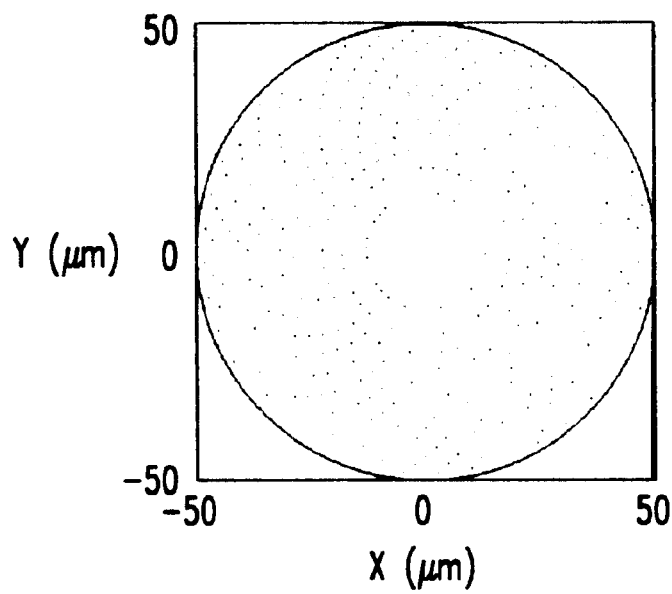
FIGS. 13A and 13B illustrate a design for multimode fiber of the invention and the calculated refractive index profile.
Figure 13:
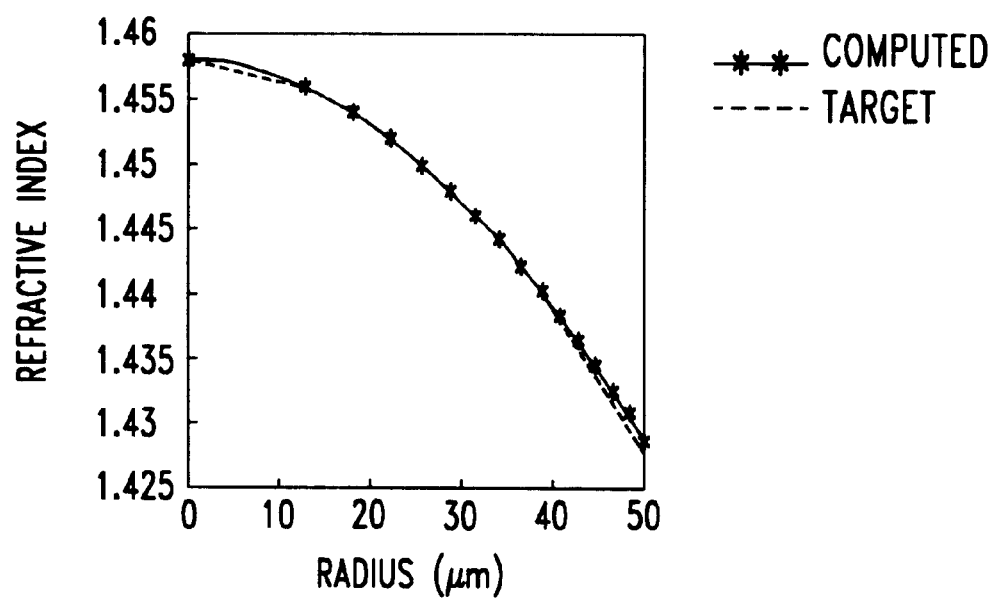

A further design for multimode fiber is shown in FIG. 13A, with the calculated refractive index profile shown in FIG. 13B. The design of this example keeps the number of holes in each ring constant, but varies the diameter of the holes with each ring, from 0.12 to 1.0 $\mu$m. This design therefore requires a tight control of hole size because small variations in hole diameter tend to cause large changes in the hole area and in turn the overall volume fraction. The holes within each ring are shifted slightly to increase radial uniformity, to minimize polarization sensitivities of the fiber.

EXAMPLE 4

Figure 14A:
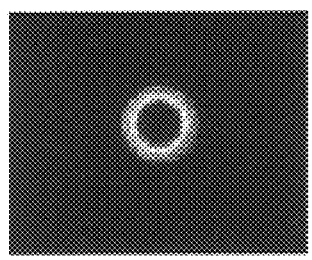
FIGS. 14A, 14B, 14C illustrate the three lowest modes of a few-mode fiber.
Figure 14B:
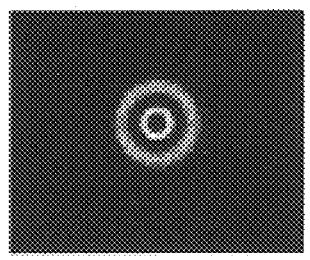
Figure 14C:
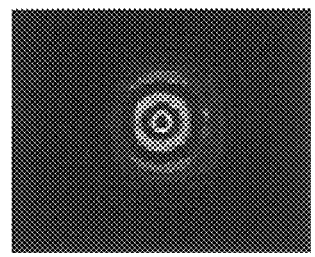

FIGS. 14A, 14B, and 14C show the three lowest modes calculated for a few mode fiber. The calculations assumed the fiber was constructed of a core material with refractive index of 1.487 and a cladding material with refractive index of 1.458, with a core diameter of 12 $\mu$m. Because of the small index difference, and core diameter, this fiber would exhibit only three modes for 1.55 $\mu$m light. The effective indices of propagation for the first, second, and third modes would be 1.4842, 1.4741, and 1.4586, respectively. The higher order modes would exhibit radial nodes with the number of nodes increasing with an associated decrease in effective index.

Figure 15A:
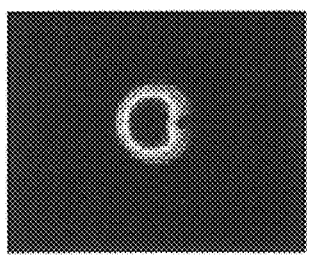
FIGS. 15A, 15B, 15C illustrate the same three modes, where the fiber has been modified to interfere with at least one propagating mode according to the invention.
Figure 15B:
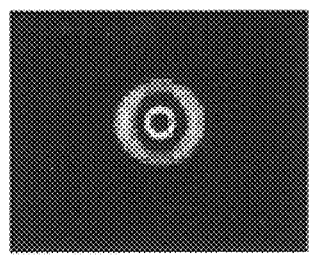
Figure 15C:
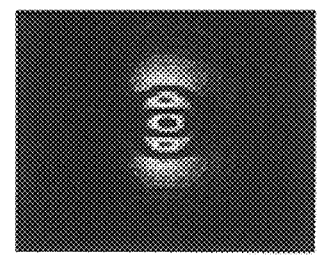

To modify the properties of such a fiber, a fiber design incorporates a single air hole in the core material, the hole having a diameter of 2 $\mu$m and located 3 $\mu$m from the center of the fiber. This location puts the air hole approximately on a node of the second order mode. The hole will therefore interact strongly with both the first and third modes but only weakly with the second. The effects on the first, second, and third modes are shown, respectively, in FIGS. 15A, 15B, and 15C. The dramatic effect on the modal profile for the third mode (FIG. 15C) arises because this mode is only weakly guided by the modified fiber. As reflected in these Figures, the fiber design changes the effective index of propagation for the modes as well as the modal profiles.

Other embodiments of the invention will be apparent to those skilled in the art from consideration of the specification and practice of the invention disclosed herein.

What is claimed is:

1. An optical fiber, comprising:

a multimode core capable of guiding a plurality of different modes comprising a first material, the core having axially oriented elements located therein, wherein the axially oriented elements are capillary air holes configured to provide a graded effective refractive index profile and the air holes provide mode mixing during propagation of multiple modes through the fiber; and a cladding region surrounding the core, wherein the cladding region exhibits a refractive index less than the effective refractive index of the portion of the core immediately adjacent the cladding region.

2. A system comprising:

a source for generating at least one wavelength of light in the range of 890 to 1600 nm; and a fiber having a multimode core capable of guiding a plurality of different modes, the fiber transmissively coupled to the source such that multiple modes of the light are launched into the fiber, the core comprising a first material having one or more axially oriented elements located therein, the axially oriented elements configured to reduce spreading of light pulses propagating in different modes, and one or more of the axially oriented elements located to provide interaction with at least one particular mode of the launched light, wherein at least one of the elements is located at a node or an anti-node of the at least one particular mode, and a cladding region surrounding the core, the cladding region exhibiting a refractive index less than the effective refractive index of the portion of the core immediately adjacent the cladding region.

3. An optical fiber, comprising:

a multimode core capable of guiding a plurality of different modes comprising a first material having axially oriented elements located therein, the axially oriented elements configured to reduce spreading of light pulses propagating in different modes and wherein at least one of the axially oriented elements is located at a node or an anti-node of at least one particular mode; and a cladding region surrounding the core region, the cladding region exhibiting a refractive index less than the effective refractive index of the portion of the core immediately adjacent the cladding region.

* * * * *